(12) United States Patent
Wolff

(10) Patent No.: US 7,523,601 B2
(45) Date of Patent: Apr. 28, 2009

(54) MOWER WITH AN UNFOLDING AND FOLDING DEVICE THAT INCLUDES A TILTING ELEMENT, A LINK ROD, AND A HYDRAULIC JACK

(75) Inventor: Michel Wolff, Waltenheim sur Zorn (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 11/814,540

(22) PCT Filed: Jan. 10, 2006

(86) PCT No.: PCT/FR2006/050009

§ 371 (c)(1),
(2), (4) Date: Jul. 23, 2007

(87) PCT Pub. No.: WO2006/079735

PCT Pub. Date: Aug. 3, 2006

(65) Prior Publication Data

US 2008/0127622 A1    Jun. 5, 2008

(30) Foreign Application Priority Data

Jan. 26, 2005    (FR)    ................... 05 50219

(51) Int. Cl.
*A01D 34/83* (2006.01)
(52) U.S. Cl. ................................... 56/228
(58) Field of Classification Search ............... 56/228, 56/6, 13.7, 295, 15.2, 15.9, 16.3, DIG. 14, 56/245; 280/414.5
See application file for complete search history.

(56) References Cited

U.S. PATENT DOCUMENTS

| | | | |
|---|---|---|---|
| 3,593,504 A * | 7/1971 | Konig et al. | 56/6 |
| 4,896,493 A * | 1/1990 | Neuerburg | 56/255 |
| 5,241,809 A * | 9/1993 | Wolff et al. | 56/16.2 |
| 5,353,579 A * | 10/1994 | Wolff | 56/15.2 |
| 5,727,371 A * | 3/1998 | Kieffer et al. | 56/6 |
| 5,839,261 A * | 11/1998 | Haberkorn et al. | 56/6 |
| 5,896,733 A * | 4/1999 | Neuerburg et al. | 56/15.2 |
| 5,934,050 A * | 8/1999 | Neuerburg et al. | 56/6 |

FOREIGN PATENT DOCUMENTS

| | | |
|---|---|---|
| DE | 195 34 695 | 3/1997 |
| FR | 2 635 433 | 2/1990 |

* cited by examiner

*Primary Examiner*—Árpád Fábián-Kovács
(74) *Attorney, Agent, or Firm*—Oblon, Spivak, McClelland, Maier & Neustadt, P.C.

(57) ABSTRACT

A mower includes a supporting structure that can be coupled to a tractor and bears a support beam to which there is articulated a cutter bar that can be brought from a work configuration into at least one transport configuration and vice versa using an unfolding and folding device. The unfolding and folding device includes a tilting element connected to the support beam and to the supporting structure, a link rod connected to the cutter bar, a double-acting jack positioned between the tilting element and the link rod.

15 Claims, 13 Drawing Sheets

MOWER WITH AN UNFOLDING AND FOLDING DEVICE THAT INCLUDES A TILTING ELEMENT, A LINK ROD, AND A HYDRAULIC JACK

BACKGROUND OF THE INVENTION

1. Field of the Invention

The invention relates to the field of agricultural machinery, more particularly that of mowers.

2. Discussion of the Background

Mowers are known from several documents, especially patents EP 839 443, EP 809 928 or FR 2 635 433 in the name of the Applicant Company. These machines are fixed to the lift system of a tractor using a supporting structure with a three-point hitching frame for coupling.

In the transport configuration, the cutter bar is folded behind the tractor in order to occupy a minimum amount of space to allow the vehicle to move around on the road network.

In the work configuration, the cutter bar is deployed to the side of the tractor so as to mow the plants.

For reasons of maximum productivity, the use of bars supporting a great many cutting tools is desirable, that is to say a cutter bar that is as long as is technically feasible.

With long cutter bars, the problem of the size of the mower in transport configuration arises.

In an attempt to solve this problem, cutter bars that can be folded backwards have been proposed. This solution is suited to machines with cutter bars of medium size, but not for machines that have very long bars, because their center of gravity becomes so far away from the tractor.

For longer cutter bars, folding the bar upwards, vertically, has proved to be an attractive solution, although here again, the permissible size for transport has proved limiting and new solutions have been investigated.

Recently, patent DE 195 34 695 has proposed folding the cutter bar beyond the vertical, at an angle of 105° to 150°, this configuration allowing the cutting tool to be positioned diagonally with respect to the tractor and therefore allowing use of a longer cutter bar. In order to achieve this configuration, the machine described has two single-acting hydraulic jacks, one of them moving the bar into the vertical position and the other moving it beyond this position, slowing its descent.

The use of two single-acting jacks between the supporting structure and the cutter bar entails a bearing frame and a complex arrangement of jacks in order to effect the various movements of the cutter bar with the protector; this solution is expensive and not very functional.

The articulations that allow the cutter bar of mowers to be unfolded and folded additionally present safety problems in the various operating configurations. For example, it is desirable for the work configuration, that is to say when the cutting tools are activated, to be able to be moved away from the horizontal position quickly, in order to avoid an obstacle or to maneuver the tractor, for example, without the need to activate the transport configuration. In this so-called maneuvering configuration, safety measures need to be in place to prevent unwanted movements of the cutter bar.

There is therefore a problem as regards the functionality and the folding—unfolding of the cutter bar using articulations that are inexpensive but have the safety measures in place that are necessary for all the configurations: transport, work or maneuvering.

SUMMARY OF THE INVENTION

It is one objective of the invention to solve these main difficulties by providing an articulation that is actuated by one single double-acting hydraulic jack.

The present invention therefore relates to a mower comprising a supporting structure that can be coupled to a tractor and bears a support beam to which there is articulated a cutter bar that can be brought from a work configuration into at least one transport configuration and vice versa using an unfolding and folding device, characterized in that said unfolding and folding device comprises:

a tilting element connected to the support beam and to the supporting structure, a link rod connected to the cutter bar, a double-acting jack positioned between said tilting element and said link rod.

An articulation of the cutter bar such as this, using a double-acting jack according to the invention, displays numerous advantages:

The cutter assembly is more lightweight and less expensive to manufacture because just one double-acting jack can be used.

The mechanism allows an easy switch from a work configuration to a maneuvering configuration or vice versa.

Each configuration can have safety measures that prevent unwanted movements of the cutter bar.

It is advantageously possible to have an additional safety measure, in the transport configuration, when the cutter bar is lying beyond the vertical, in order to compensate for the failure of the tractor's hydraulic circuit and therefore prevent the tool from falling down and becoming damaged in such an eventuality.

BRIEF DESCRIPTION OF THE DRAWINGS

Other features and advantages of the invention will become evident from the description which will follow, with reference to the attached drawings which are given merely by way of nonlimiting examples.

DETAILED DESCRIPTION OF THE PREFERRED EMBODIMENTS

Figure 1:
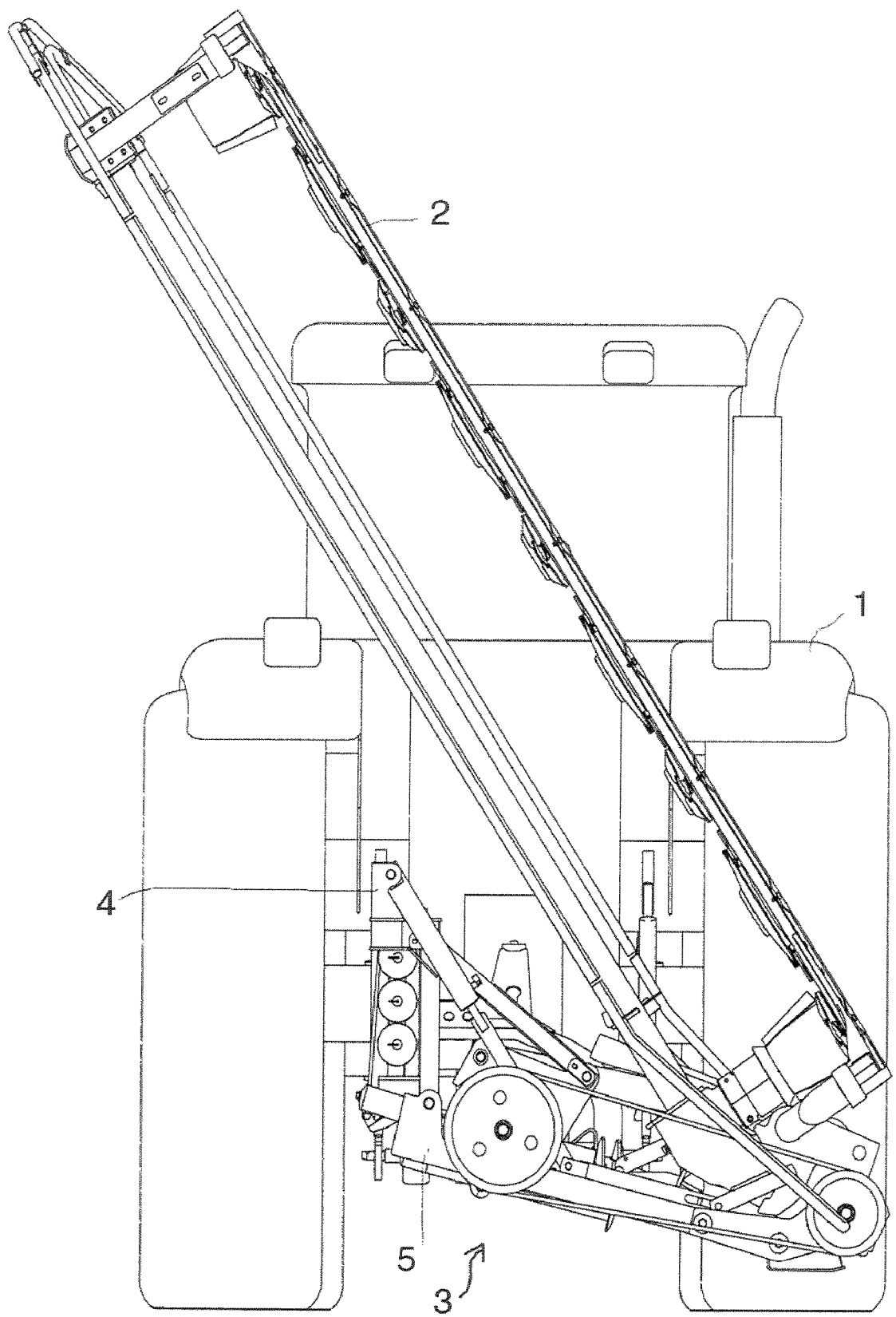
FIG. 1 is an overall view from the rear of a tractor having a mower comprising a device according to the invention for unfolding and folding the cutter bar, in the transport configuration.

The mower according to the invention has a cutter bar 2 formed of a casing of elongate shape bearing several rotary cutting tools 25. These can be rotationally driven in a way known per se off a tractor. In FIGS. 2 to 11 the transmission system for operating the cutting tools 25 and the various protective means of the mower have not been depicted, in order to make the invention easier to understand.

The cutter bar 2 comprises a drive transmission box 9 which is connected by a substantially horizontal articulation 17 to a support beam 5. The latter is also articulated via a substantially horizontal axis 26 to a supporting structure 4 equipped in a way known per se with a three-point hitching frame for coupling to the lift system of the tractor.

FIG. 1 illustrates the position of the mower in the transport configuration, that is to say folded at the rear of the tractor 1, in a diagonal plane. The cutter bar 2 is pivoted at substantially 125° with respect to the horizontal and with respect to the work configuration.

A device 3 for unfolding and folding the cutter bar 2 lies between the latter and the supporting structure 4.

The device 3 according to the invention allows the cutter bar 2 to be unfolded from the transport configuration to the work configuration which lies horizontally.

The device 3 also allows the switch from a so-called maneuvering configuration in which the cutter bar is raised and clear of the field so as to allow the tractor to maneuver, for example to turn round or to pass over a windrow or an obstacle that could damage the cutting elements.

The device 3 also allows the cutter bar 2 to be folded from the work configuration to the transport configuration.

The various movements of the cutter bar 2 are controlled directly by the driver of the tractor from his cab.

Figure 2:
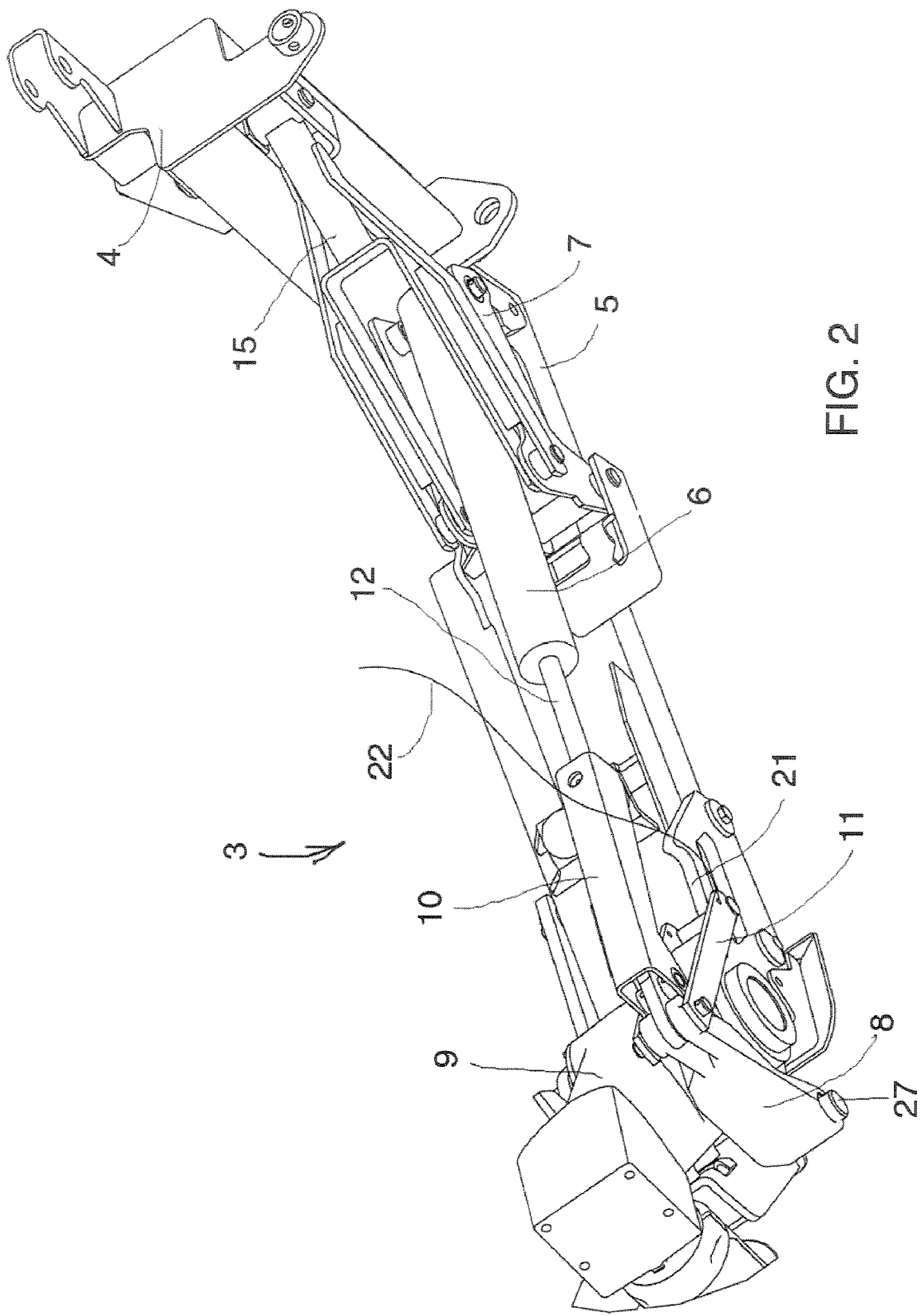
FIG. 2 is a perspective view from above of the device for unfolding and folding the cutter bar.

FIG. 2 illustrates the arrangement of the various essential elements of the device for unfolding and folding the cutter bar 2 and, in particular, the support beam 5 fixed to the supporting structure 4, a double-acting jack 6 fixed by an axis 28 to a tilting element 7, in respect of its part closest to the tractor, and to a link rod 8 in respect of its part furthest away. Said link rod 8 is itself articulated to the drive transmission box 9 by means of a substantially horizontal axis 27.

This FIG. 2 also shows the protector 10 fixed to the end of the jack 6 close to the link rod 8 and the safety arm 11 articulated to said link rod.

The device 3 for unfolding and folding the cutter bar 2 of the mower has three main configurations: a transport configuration, a work configuration and a maneuvering configuration; in each configuration, the travel allowed to the cutter bar 2 is dependent on the possibility of movement of the protector 10 and/or of the safety arm 11.

For a better understanding of how the device for unfolding and folding the cutter bar 2 according to the invention works, reference is made to FIGS. 3 to 11 which show the various essential elements in side view in the various configurations of use and in intermediate positions.

Figure 3:
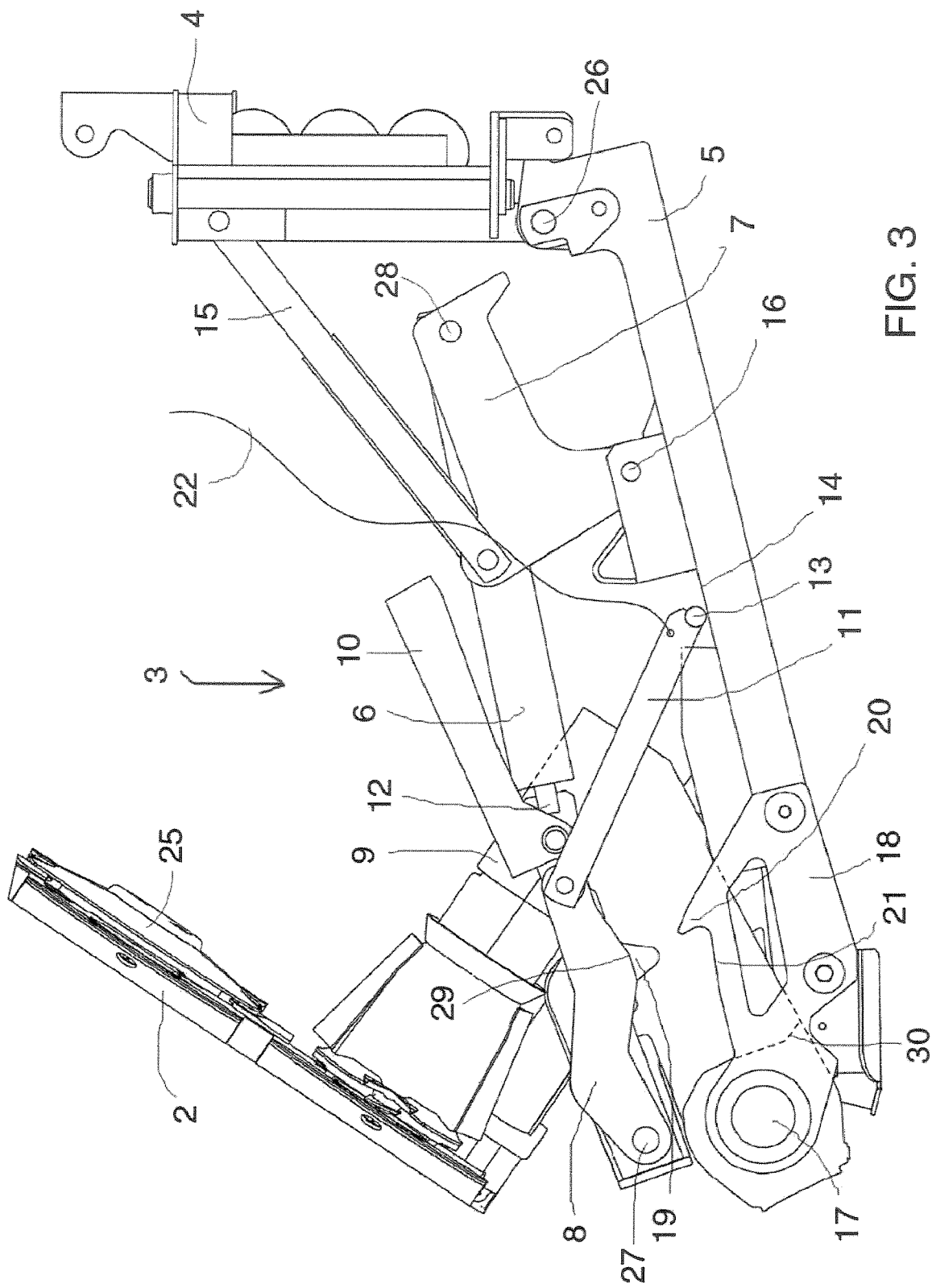
FIG. 3 illustrates a side view of the device in the transport configuration.

FIG. 3 illustrates the transport configuration of the mower with the piston 12 of the jack 6 fully retracted. In this position, the action of the jack 6 has the effect of placing the tilting element 7 in a raised position and the link rod 8 in a position substantially parallel to the plane of the support beam 5. The sliding end 13 of the safety arm 11 is located in a notch 14 formed on the support beam.

The tilting element 7 is connected by means of the axis 16 to the support beam 5 and via a support 15 to the supporting structure 4. Depending on the direction in which the jack 6 is actuated, the tilting element 7 will pivot in one direction or the other about the axis 16, and this has the effect of raising or lowering the support beam 5 with respect to the horizontal, and therefore of raising or lowering the cutter bar 2 when it is unfolded in the work configuration. Said tilting element 7 thus limits the travel of the support beam 5 about the axis 26.

The link rod 8 situated at the opposite end of the jack 6 with respect to the tilting element 7 provides the interface between the cutter bar 2 with its drive transmission box 9 and the jack 6.

The link rod 8 rotates about the axis 27 and bears via its face 29 against a stop-forming part 30 provided on the box 9 (see FIG. 13) to control the movement of the cutter bar 2 about the articulation 17 from the horizontal position to the vertical position and vice versa.

The link rod 8 bears a safety arm 11 intended to collaborate with a rib 21 and a stop 20 borne by the anterior end 18 of the support beam 5.

Figure 8:
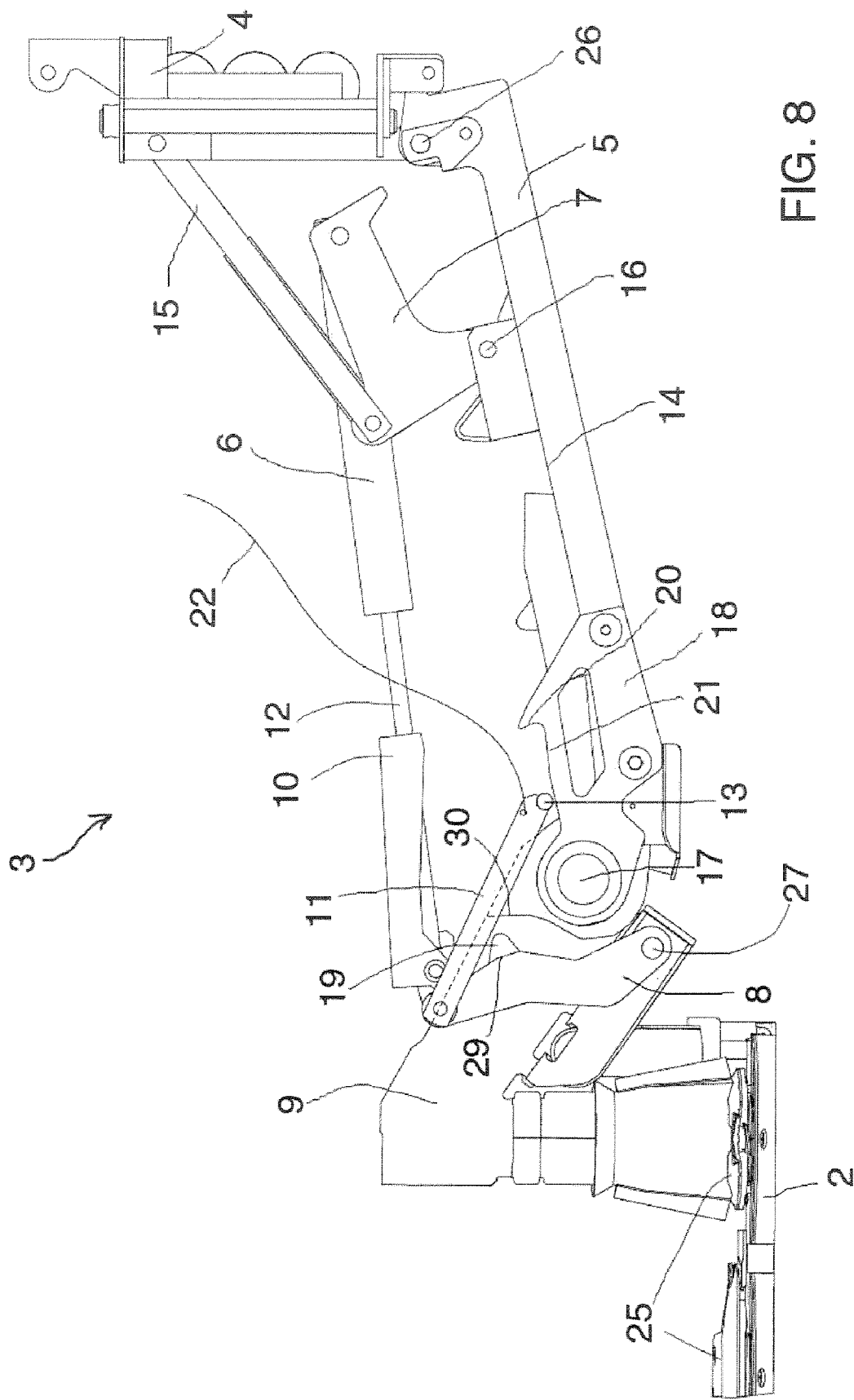
FIG. 8 corresponds to the work configuration of the mower.

This safety arm 11 has a great deal of travel between the transport configuration illustrated in FIG. 3 and the work configuration illustrated in FIG. 8.

Figure 4:
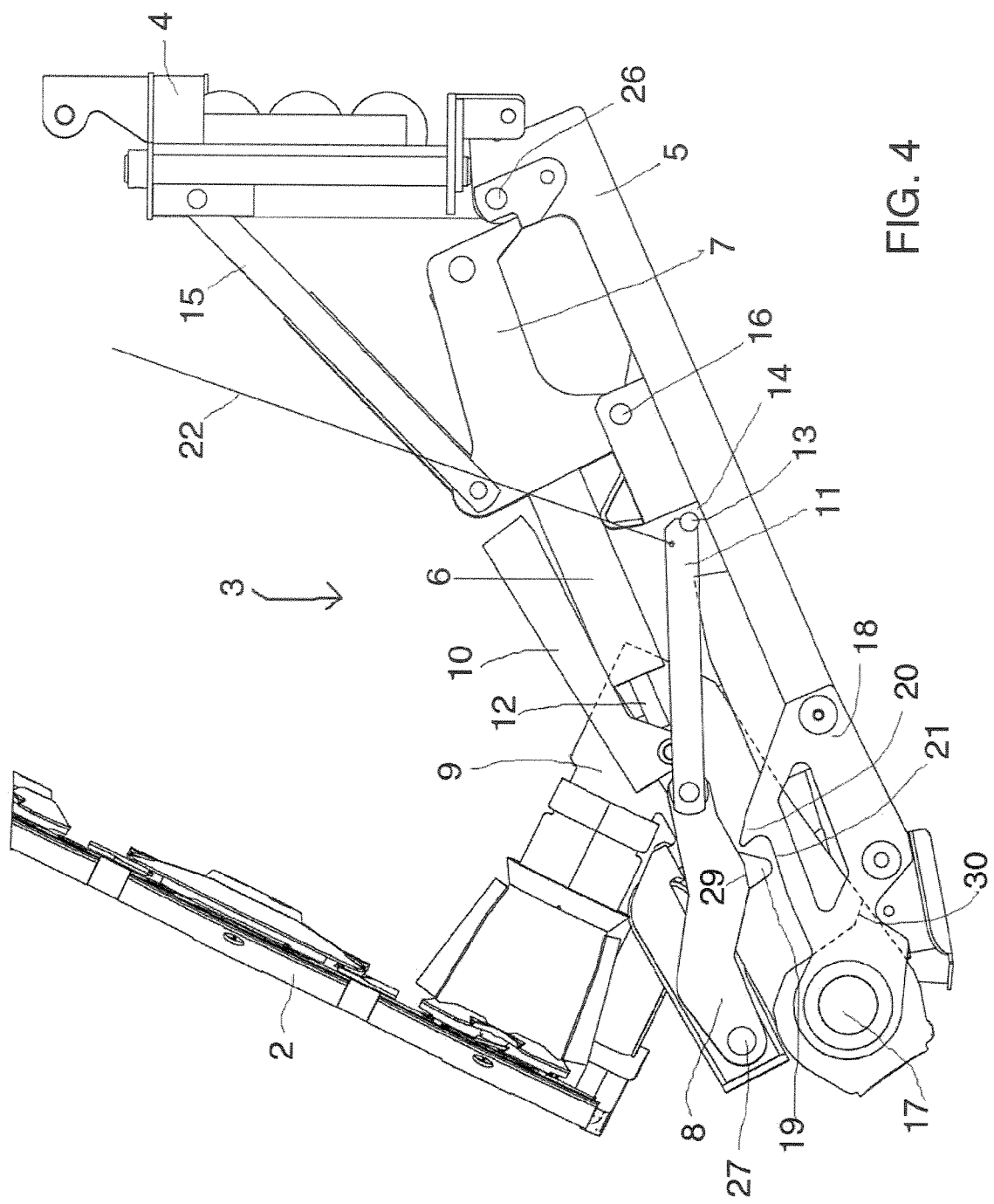
FIGS. 4 to 7 are intermediate positions between the transport configuration and the work configuration, which are obtained both when unfolding and when folding the cutter bar.
Figure 5:
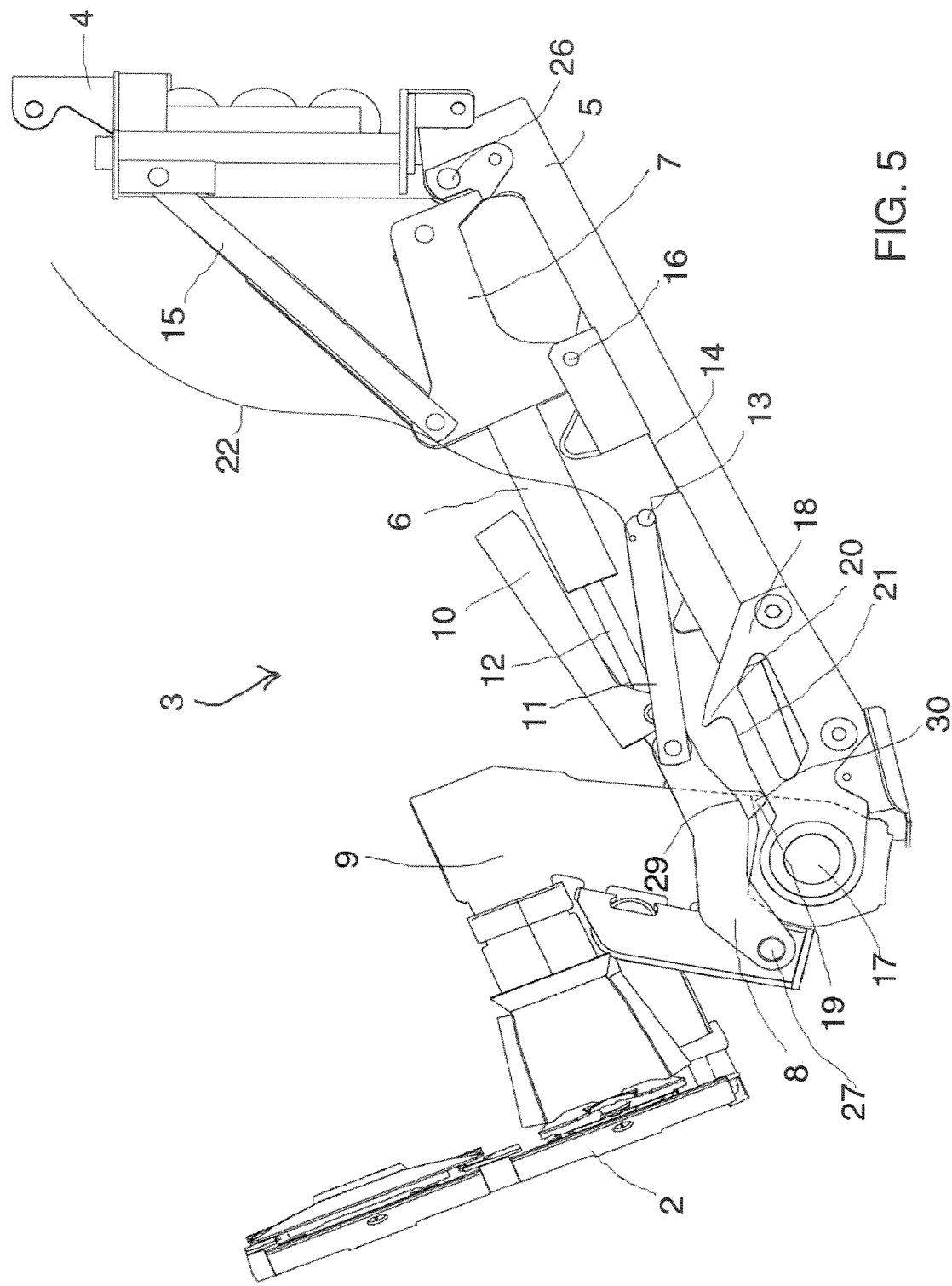
Figure 6:
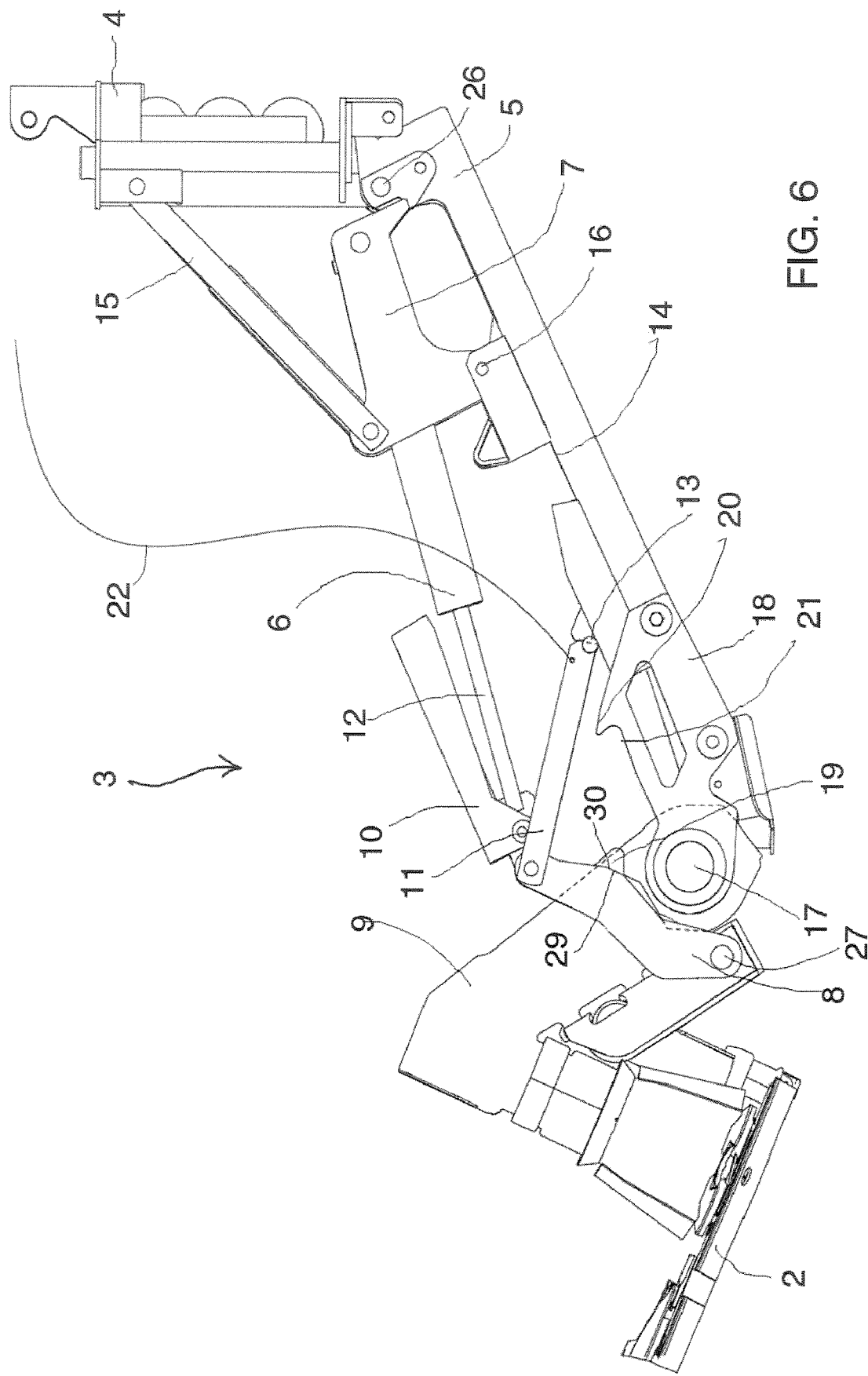
Figure 7:
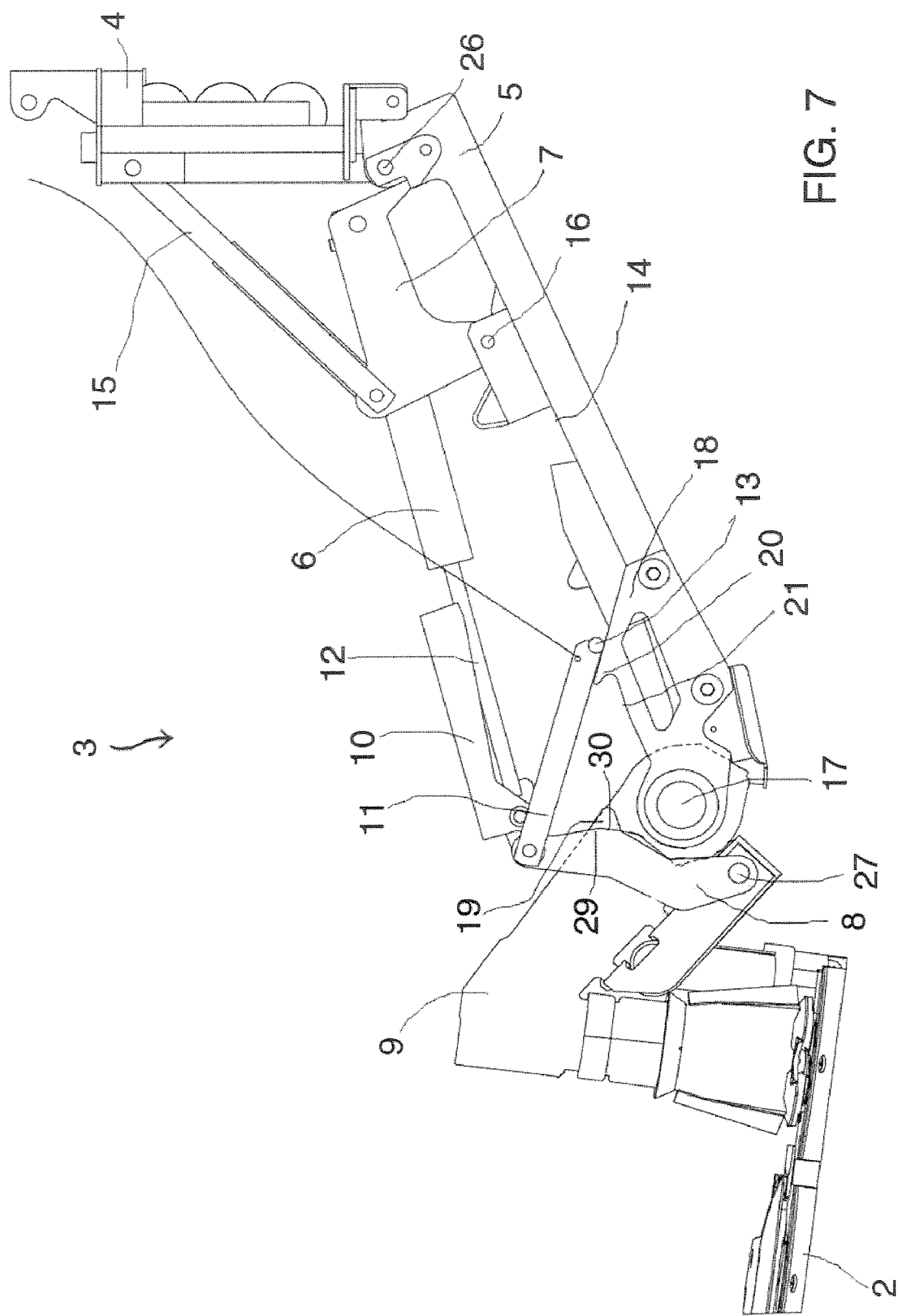

The link rod 8 additionally comprises a protrusion 19 which butts against the rib 21 of the support beam 5 when the cutter bar 2 is in the vertical or near-vertical position. This intermediate position is depicted in FIG. 4.

Figure 13:
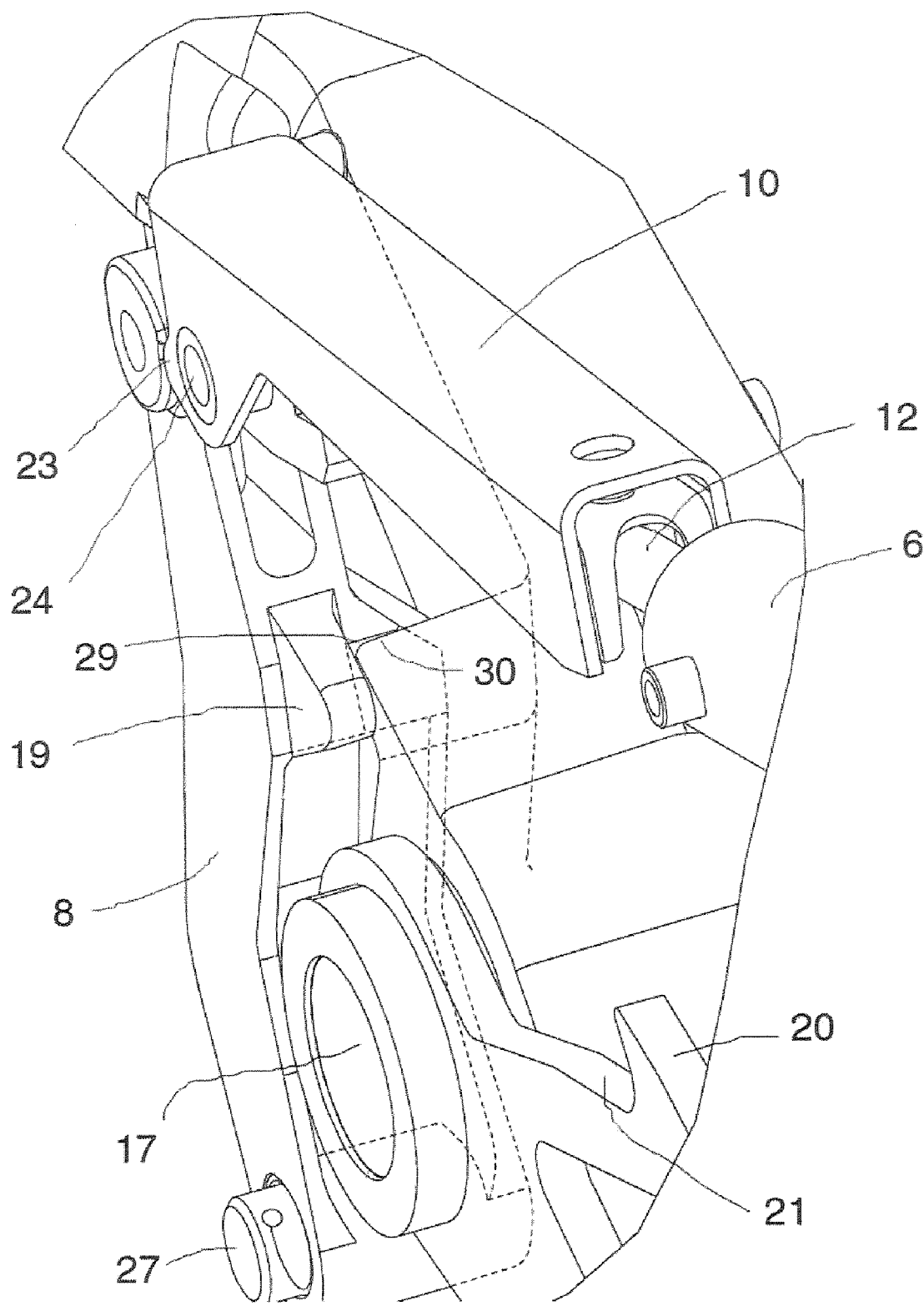
FIG. 13 shows a perspective part view of the link rod and of the protector.

Fixed to the anterior end of the jack 6, near the link rod 8, is a protector 10, the inverted U shape of which is clearly visible in FIG. 13. This component is intended to block the travel of the piston 12 and therefore cause the tilting element 7 to pivot forwards and raise the support beam 5 towards the horizontal by pivoting about the axis 26 during the switch from the work configuration to the maneuvering configuration.

In the transport configuration, the cutter bar 2 is retained via the double-acting jack 6, although if the hydraulic circuit were to become accidentally ruptured, the sliding end 13 would become blocked in the notch 14, preventing the cutter bar 2 from falling and unfolding.

FIGS. 4 to 7 illustrate intermediate positions both in the unfolding and in the folding between the transport configuration described earlier and the work configuration illustrated in FIG. 8.

During the movement in the unfolding direction, the jack 6 is controlled in order to lengthen and push on the link rod 8. The cutter bar 2 therefore describes a counterclockwise direction about the axis 17, which axis is borne by the anterior end 18 of the support beam 5. The safety arm 11 is removed from the notch 14 using the cable 22. Next, it is driven in this movement, moves along the support beam and passes the stop 20 to reach the work configuration. In this work configuration, the piston of the jack 6 is in a position of maximum extension, having pivoted the tilting element 7 forward to the end of its travel.

As can be seen in FIG. 8, the cutter bar 2 is in a horizontal position in the work configuration and the support beam 5 is partially raised towards the horizontal position under the combined action of the jack 6 and of the tilting element 7. Said cutter bar 2 extends to the side of the tractor and can follow the surface of the ground with a view to mowing standing plants.

Figure 9:
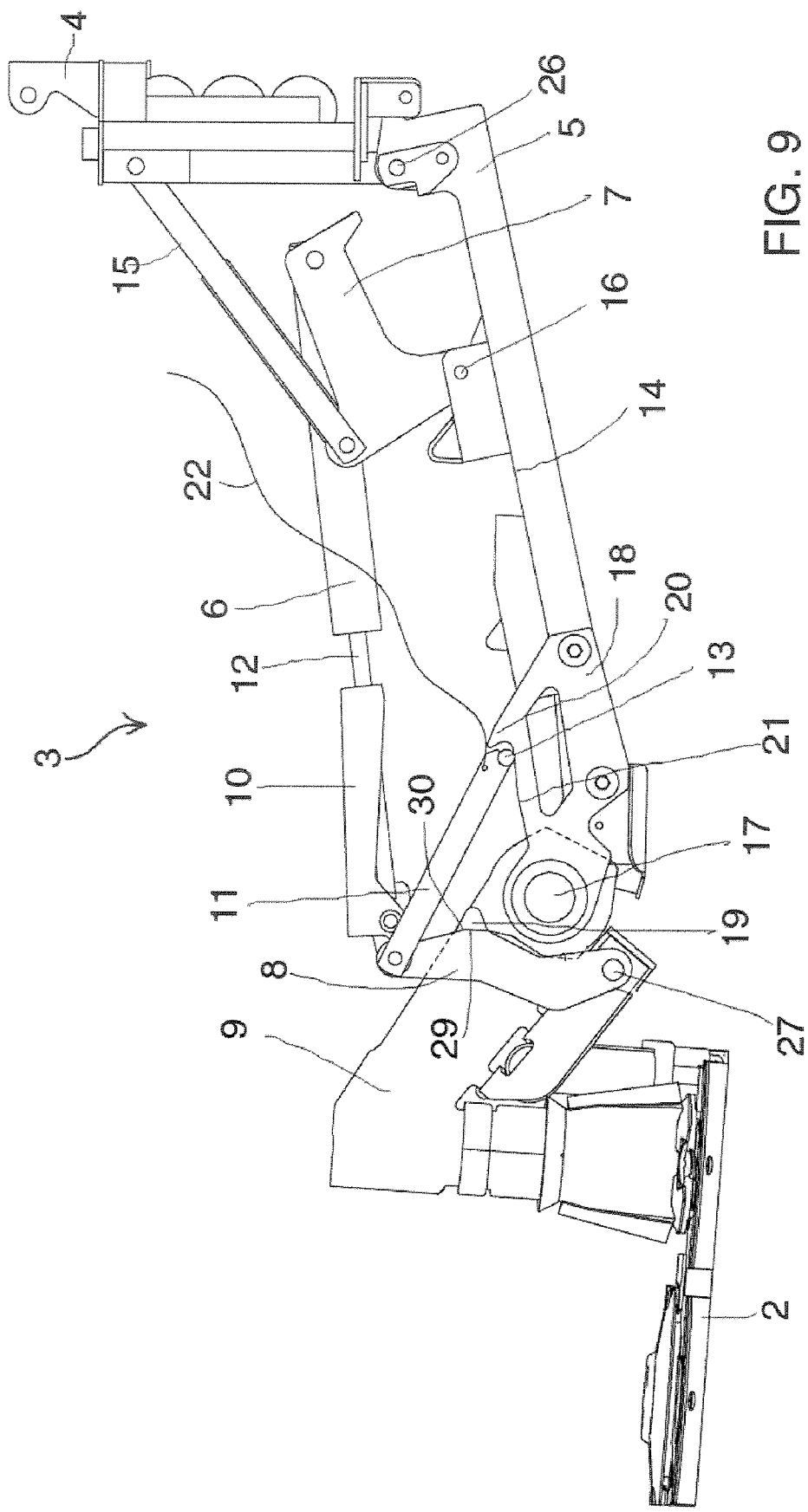
FIGS. 9 and 10 are intermediate positions between the work configuration and the maneuvering configuration.
Figure 10:
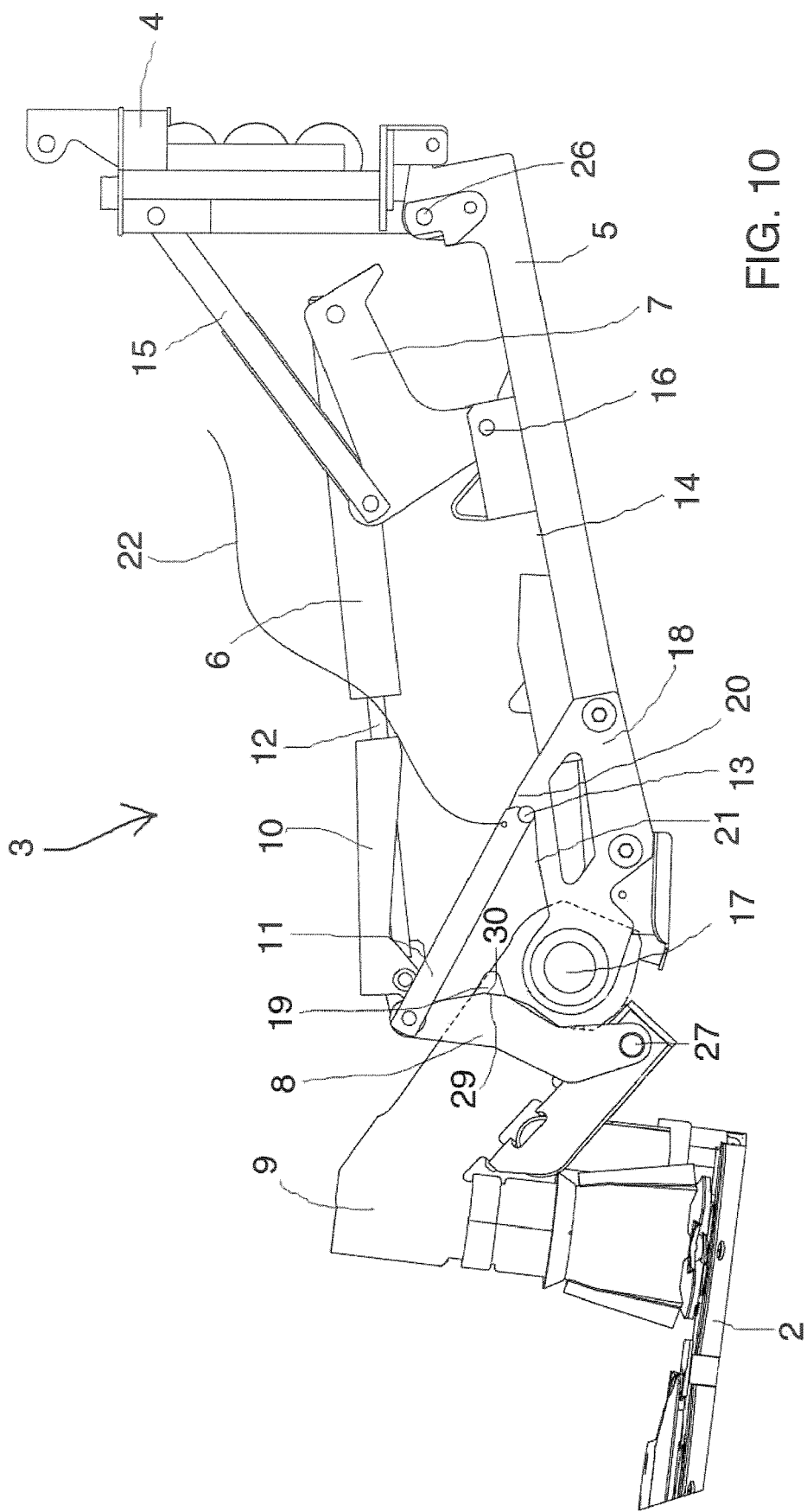
Figure 11:
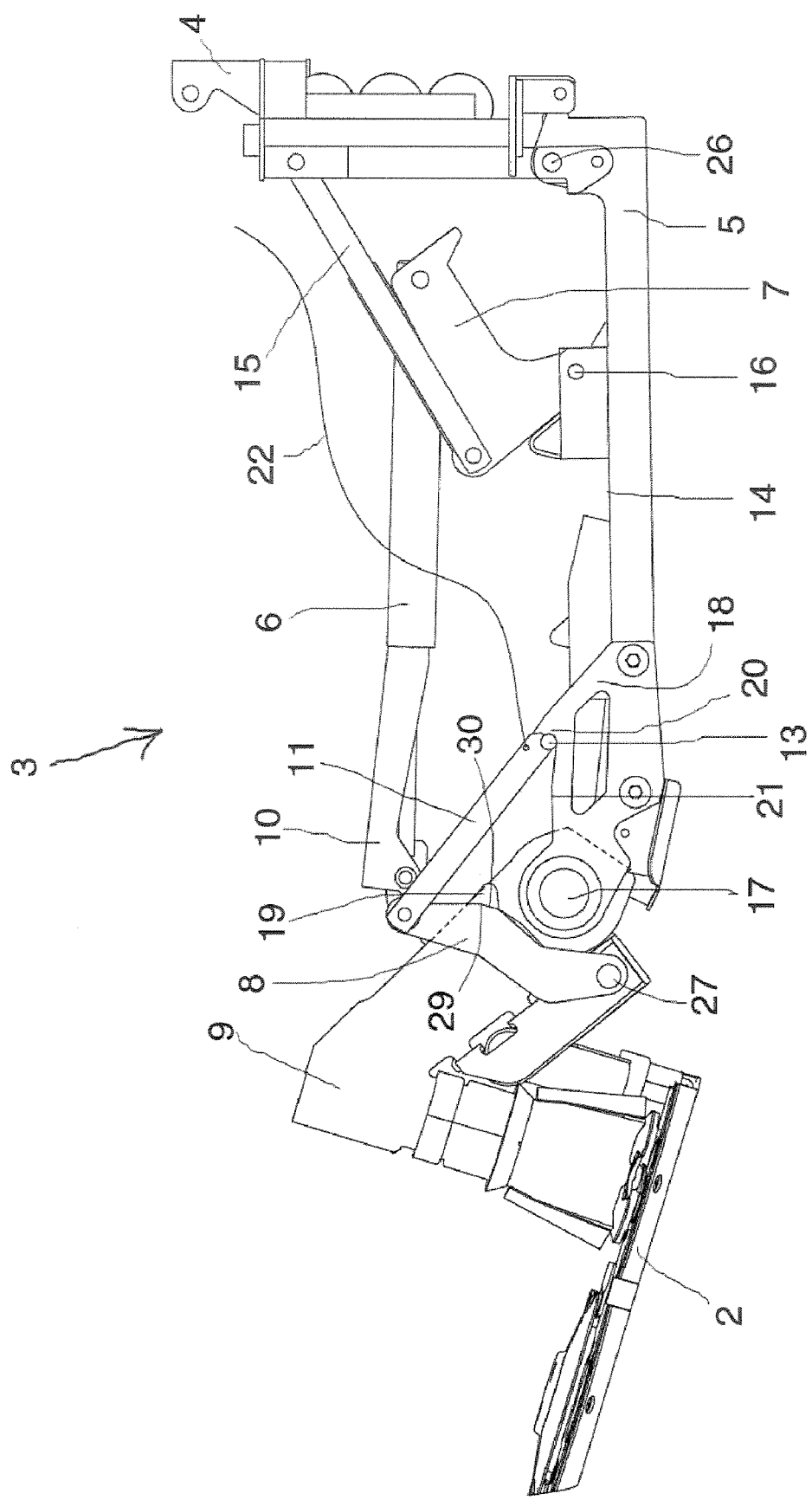
FIG. 11 illustrates the device for unfolding and folding the cutter bar in the maneuvering configuration.

FIGS. 9 to 11 illustrate the switch from the work configuration 2 to the maneuvering configuration in which the cutter bar 2 and the support beam 5 are raised clear of the ground.

Under the action of the jack 6 which is made to shorten, the link rod 8 bears against the stop 30 and rotates the box 9 and the bar 2 clockwise about the axis 17, in the opposite direction to the direction employed in the unfolding maneuver. The safety arm 11 slides in the rib 21 until it reaches the stop 20 which blocks its travel and consequently causes increased tension on the tilting element 7, which tension has the effect of raising the support beam 5 into the horizontal position.

Said blocking also immobilizes the link rod 8 in such a way that the latter does not disengage the protector 10 from the jack 6.

The travel of the piston 12 for shortening purposes is therefore blocked by the protector 10 bearing against the body of the jack 6, thus limiting any movement of the cutter bar 2 with respect to the supporting structure 4.

When the driver of the tractor wishes to switch from the work configuration to the transport configuration, he proceeds in the same way as described above. However, it is necessary to actuate a cable 22 fixed near the sliding end 13 of the safety arm 11 in order to make it pivot upwards and allow it to pass the stop 20. This cable 22, which extends as far as the tractor cab, is actuated by the driver.

Under the action of the jack 6 and the shortening of the piston 12, once the stop 20 has been negotiated, the safety arm 11 continues the same path as it followed during the unfolding of the cutter bar 2, in the opposite direction, to reach the end-of-travel notch 14.

The protector 10 has a cam 23 operating together with the link rod 8 in such a way that said protector is automatically raised during the operation of folding the cutter bar 2 and placing it in the transport configuration, so that said protector 10 does not block the piston 12 in its travel into this position.

Figure 12:
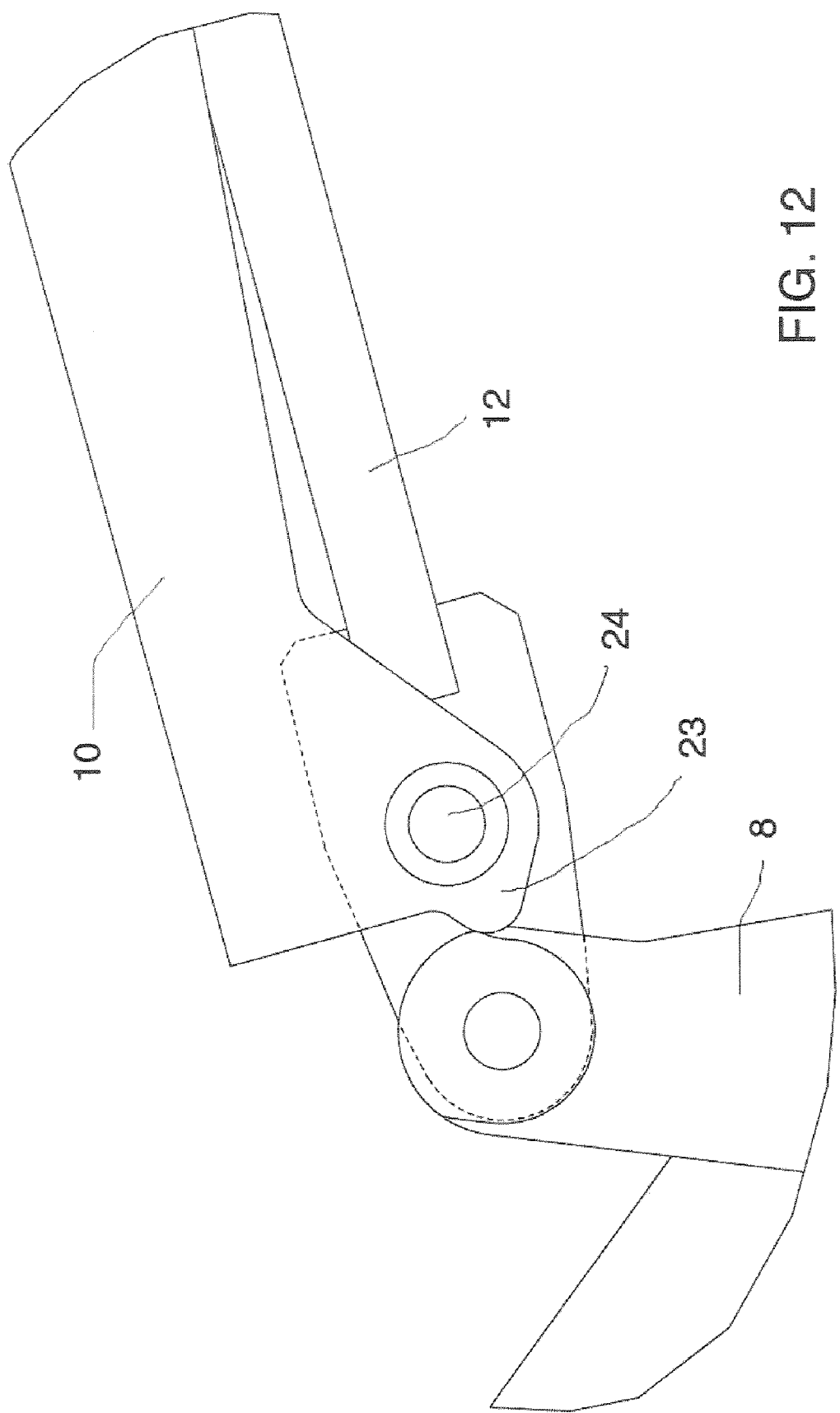
FIG. 12 shows a side view of the cam borne by the protector.

The illustration of this cam 23 as depicted in FIG. 12 provides the understanding that when the cable 22 is actuated and the safety arm 11 passes over the stop 20, the link rod 8 finds itself positioned in such a way that the protector 10 is driven in rotation counterclockwise about the axis 24, and is therefore raised so that it no longer blocks the travel of the piston 12.

During the phases of unfolding and folding the tilting element 7 stabilizes, coming into abutment against the end of the support beam 5 which is articulated to the supporting structure 4.

FIG. 13 illustrates in perspective the link rod 8 and the protector 10 for a better understanding of the operating mechanism described earlier; for better clarity, this figure does not depict the safety arm 11.

There are several possible variants regarding the cutting tools 25 borne by the cutter bar 2 or the device coupling said tools with the drive mechanism located on the tractor, without departing from the scope of the invention.

Diverse variants may be envisioned as regards the shapes, sizes and materials used to produce the constituent parts of the device for unfolding and folding the cutter bar 2 of the mower without departing from the scope of the invention.

Of course, the invention is not restricted to the embodiments described and depicted by way of examples but also encompasses all technical equivalents and combinations thereof.

The invention claimed is:

1. A mower comprising a supporting structure that can be coupled to a tractor and bears a support beam to which there is articulated a cutter bar that can be brought in a work configuration, in a maneuvering configuration and in at least one transport configuration using an unfolding and folding device, wherein said unfolding and folding device comprises:
   a tilting element articulated to the support beam and connected to the supporting structure via a support articulated on the supporting structure,
   a link rod articulated to the cutter bar,
   a double acting hydraulic jack having a piston and being positioned between said tilting element and said link rod,
   a safety arm configured to block a movement of the link rod in the maneuvering configuration, and
   a protector configured to block a movement of the piston in the maneuvering configuration.

2. The mower as claimed in claim 1, wherein the tilting element is articulated using axis to the support beam and to the support.

3. The mower as claimed in claim 1, further comprising in each configuration, the amount of travel allowed to the cutter bar is dependent on the possibility of movement of the protector and/or of the safety arm.

4. The mower as claimed in claim 1, wherein the link rod is articulated using an axis to a drive transmission box which constitutes an integral part of the cutter bar and which is connected to the support beam by an articulation.

5. The mower as claimed in claim 4, wherein the drive transmission box comprises a part that forms a stop for the link rod.

6. The mower as claimed in claim 1, wherein the safety arm is connected to the link rod.

7. The mower as claimed in claim 6, wherein the safety arm collaborates with a stop positioned on the support beam so as to limit the movement of the link rod in the maneuvering configuration.

8. The mower as claimed in claim 7, wherein the safety arm is connected to a cable allowing to make pivot said safety arm upwards to switch from the work configuration to the transport configuration and vice versa.

9. The mower as claimed in claim 1, wherein the link rod comprises a protrusion configured to collaborate with a rib borne by the support beam when the cutter bar is in a vertical or near vertical position during unfolding or folding.

10. The mower as claimed in claim 3, wherein the double-acting jack bears the protector at its end connected to the link rod.

11. The mower as claimed in claim 10, wherein the protector comprises a cam operating together with the link rod.

12. The mower as claimed in claim 6, wherein the safety arm can move along the support beam and engage in a notch positioned on said support beam, in the transport configuration, when the cutter bar is folded beyond the vertical, which notch can be used to prevent the cutter bar from falling down if the hydraulic circuit bursts and the double-acting jack fails.

13. The mower as claimed in claim 5, wherein said double acting hydraulic jack is configured to shorten thereby acting on the link rod to bear against the stop and to rotate the drive transmission box and the cutter bar clockwise about the articulation.

14. The mower as claimed in claim 5, wherein said safety arm slides with respect to the support beam until said safety arm reaches the stop that is configured to stop said safety arm from sliding and to thereby increase a tension on the tilting element, wherein said tension raises the support beam into a horizontal position.

15. The mower as claimed in claim 14, wherein said block is further configured to immobilize the link rod in such a way that the link rod does not disengage the protector from the double acting hydraulic jack.

* * * * *